United States Patent
Gao et al.

(10) Patent No.: US 11,606,720 B2
(45) Date of Patent: *Mar. 14, 2023

(54) FLOW CONTROL METHOD AND APPARATUS, CU, DU AND STORAGE MEDIUM

(71) Applicant: ZTE Corporation, Guangdong (CN)

(72) Inventors: Yin Gao, Shenzhen (CN); Qingchun He, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 37 days.

This patent is subject to a terminal disclaimer.

(21) Appl. No.: 17/501,541

(22) Filed: Oct. 14, 2021

(65) Prior Publication Data

US 2022/0070735 A1   Mar. 3, 2022

Related U.S. Application Data

(63) Continuation of application No. 16/457,581, filed on Jun. 28, 2019, now Pat. No. 11,153,783, which is a
(Continued)

(30) Foreign Application Priority Data

Dec. 29, 2016 (CN) .......................... 201611245343.X

(51) Int. Cl.
*H04W 28/10* (2009.01)
*H04W 76/12* (2018.01)
(Continued)

(52) U.S. Cl.
CPC ........... *H04W 28/10* (2013.01); *H04W 76/12* (2018.02); *H04W 76/27* (2018.02); *H04W 80/02* (2013.01); *H04W 80/08* (2013.01)

(58) Field of Classification Search
CPC ........ H04B 10/2575; H04L 47/10–431; H04L 49/90; H04L 63/00; H04N 21/2402;
(Continued)

(56) References Cited

U.S. PATENT DOCUMENTS 10,271,244 B2   4/2019   Zaghloul et al.
2007/0097864 A1  5/2007   Bernstein
(Continued)

FOREIGN PATENT DOCUMENTS

CN   1909508 A   2/2007
CN   1937586 A   3/2007
(Continued)

OTHER PUBLICATIONS

First Office Action for CN Appl. No. 201611245343.X, dated Oct. 12, 2020 (10 pages, including English translation).
(Continued)

*Primary Examiner* — Thomas R Cairns
(74) *Attorney, Agent, or Firm* — Foley & Lardner LLP

(57) ABSTRACT

Provided are a flow control method and device, a CU and a DU. The method includes: receiving a flow control state message transmitted by a second network element connected to a first network element through a fronthaul interface; where the flow control state message carries flow control state information for identifying a flow control state of the second network element, and where the first network element and the second network element have different functions, and performing a flow control processing according to the flow control state information and interacting the flow control state of the second network element. Further provided is a computer storage medium.

16 Claims, 7 Drawing Sheets

Related U.S. Application Data continuation of application No. PCT/CN2017/110291, filed on Nov. 9, 2017.

(51) Int. Cl.
*H04W 76/27* (2018.01)
*H04W 80/02* (2009.01)
*H04W 80/08* (2009.01)

(58) Field of Classification Search
CPC .. H04N 21/2662; H04W 12/02; H04W 16/08; H04W 28/0231–0242; H04W 28/0247; H04W 28/0278; H04W 28/0289; H04W 28/10–14; H04W 36/22; H04W 72/12; H04W 76/12; H04W 80/02; H04W 80/08–12; H04W 88/085; H04W 92/12
See application file for complete search history.

(56) References Cited

U.S. PATENT DOCUMENTS

| | | |
|---|---|---|
| 2015/0103666 A1 | 4/2015 | Terry et al. |
| 2015/0163155 A1 | 6/2015 | Beheshti-Zavareh et al. |
| 2019/0149599 A1 | 5/2019 | Bartfai-Walcott et al. |
| 2019/0254108 A1 | 8/2019 | Iwai et al. |
| 2019/0342809 A1 | 11/2019 | Kim |

FOREIGN PATENT DOCUMENTS

| | | |
|---|---|---|
| CN | 101854402 A | 10/2010 |
| WO | WO-2013/167647 A1 | 11/2013 |

OTHER PUBLICATIONS

Catt et al.: "Considerations on RAN function split between CU and DU", 3GPP DRAFT; R3-162863; RAN WG3, Reno, Nevada, (Nov. 14, 2016), (6 pages).
CMCC, "Clarification for flow control buffer of option 3-2", 3GPP TSG RAN WG3 #94, R3-162881, Reno, Nevada, USA, Nov. 14-18, 2016 (2 pages).
Final Office Action on U.S. Appl. No. 16/457,581 dated Feb. 8, 2021.
First EP Office Action on EP 17887712.2 dated Nov. 13, 2020 (11 Pages).
International Search Report and Written Opinion for International Appl. No. PCT/CN2017/110291, dated Jan. 26, 2018.
Non-Final Office Action on U.S. Appl. No. 16/457,581 dated Aug. 13, 2020.
Notice of Allowance on U.S. Appl. No. 16/457,581 dated May 19, 2021.

FLOW CONTROL METHOD AND APPARATUS, CU, DU AND STORAGE MEDIUM

CROSS-REFERENCE TO RELATED APPLICATIONS

This application claims the benefit of priority under 35 U.S.C. § 120 as a continuation of U.S. patent application Ser. No. 16/457,581, filed on Jun. 28, 2019, which is a continuation of PCT Patent Application No. PCT/CN2017/110291, filed on Nov. 9, 2017, which claims the benefit of priority to Chinese Patent Application No. 201611245343.X, filed on Dec. 29, 2016, the disclosure of each of which is incorporated herein by reference in their entireties.

TECHNICAL FIELD

The present disclosure relates to the field of communications, and specifically, to a flow control method and device, a centralized unit and a distributed unit and a computer storage medium.

BACKGROUND

In the fifth generation (5G) mobile communications, massive connections and strict rate requirements pose a great challenge to transmission capacities of a fronthaul interface and a common public radio interface (CPRI) between a base band unit (BBU) and a radio remote unit (RRU) in the Long Term Evolution (LTE) system. The CPRI interface is used for the transmission of an in-phase quadrature (IQ) signal subject to processing such as physical layer coding and modulation, relatively strict requirements are imposed on a transmission delay and a bandwidth of the CPRI interface. When the rate of a 5G air interface is increased to tens of Gbps, the traffic demand of the CPRI interface will reach a Tbps level, which puts tremendous pressure on network deployment costs and difficulties.

In view of this, the network function splitting based on specific requirements is proposed in the related art, network elements having different function requirements are connected through the fronthaul interface. However, how to implement flow control among the network elements having different function requirements, there is no solution in the related art.

SUMMARY

Embodiments of the present disclosure provide a flow control method and device, a CU, a DU and a storage medium to at least solve the problem in the related art how to implement flow control between network elements having different function requirements.

According to an embodiment of the present disclosure, a flow control method is provided. The method includes: receiving a flow control state message transmitted by a second network element connected to a first network element through a fronthaul interface, where the flow control state message carries flow control state information for identifying a flow control state of the second network element; and performing a flow control processing according to the flow control state information.

According to another aspect of the present disclosure, a flow control method is provided. The method includes: determining a flow control state of a second network element connected to a first network element through a fronthaul interface, and transmitting a flow control message to the first network element, where the flow control state message carries flow control state information for identifying the flow control state of the second network element; the flow control state information is used for performing a flow control processing.

In some embodiments, before determining the flow control state of the second network element connected to the first network element through the fronthaul interface, the method further includes: receiving a data transmission message transmitted by the first network element, where the data transmission message carries data identification information for identifying data transmitted from the first network element to the second network element.

In some embodiments, the data identification information includes at least one of the following: a data packet serial number for identifying the transmitted data, and packet retransmission indication information for identifying whether the transmitted data is retransmission data.

In some embodiments, before determining the flow control state of the second network element connected to the first network element through the fronthaul interface, the method further includes: receiving information of the first network element transmitted by the first network element for assisting the second network element in implementing flow control; and performing the flow control processing according to the received information of the first network element for assisting the second network element in implementing the flow control.

In some embodiments, the information of the first network element for assisting the second network element in implementing flow control includes at least one of: a buffer size of the first network element, a buffer size provided by the first network element based on user equipment capability, request information through which the first network element requests the second network element to report a flow control state of the second network element.

In some embodiments, the flow control state message is transmitted to the first network element in at least one of the following manners: the flow control state message is encapsulated in a header of a general packet radio service (GPRS) tunneling protocol-user plane (GTP-U); and the flow control state message is implemented through a control plane interface message.

In some embodiments, the flow control state information includes at least one of: identification information of a data packet received by the second network element from the first network element and successfully transmitted to UE; a desired buffer size of a protocol data unit (PDU) session in the second network element; a desired buffer size of a data flow in the second network element; a desired buffer size of a radio bearer (RB) in the second network element; a desired buffer size of the second network element based on a physical layer parameter configuration numerology; a desired buffer size of the second network element based on a network slice; a minimum UE-level desired buffer size; identification information for notifying the first network element of a data packet lost in the second network element; a second network element congestion indication for indicating congestion of the second network element; an overall available buffer size of the second network element; and a flow control indication transmitted by the second network element to the first network element.

According to an aspect of the present disclosure, a flow control device is provided. The flow control device includes: a first receiving module and a first processing module. The first receiving module is configured to receive a flow control state message transmitted by a second network element connected to a first network element through a fronthaul interface, where the flow control state message carries flow control state information for identifying a flow control state of the second network element. The first processing module is used for performing a flow control processing according to the flow control state information.

In some embodiments, the device further includes: a first transmission module, which is configured to transmit a data transmission message to the second network element, where the data transmission message carries data identification information for identifying the first network element to the second network element, the data identification information is used for identifying data transmitted from the first network element to the second network element.

In some embodiments, the device further includes: a second transmission module, which is configured to transmit information of the first network element to the second network element for assisting the second network element in implementing flow control.

In some embodiments, the first receiving module is further configured to receive the flow control state message transmitted by the second network element communicated with the first network element through the fronthaul interface in at least one of the following manners: the flow control state message is encapsulated in a header of a general packet radio service (GPRS) tunneling protocol-user plane (GTP-U); and the flow control state message is implemented through a control plane interface message.

According to another aspect of the present disclosure, a centralized unit (CU) is provided. The CU includes any one of the flow control device described above.

According to an aspect of the present disclosure, a flow control device is provided. The flow control device includes: a determination module and a third transmission module. The determination module is configured to determine a flow control state of a second network element connected to a first network element through a fronthaul interface. The third transmission module is configured to transmit a flow control message to the first network element. The flow control state message carries flow control state information for identifying the flow control state of the second network element, and the flow control state information is used for performing a flow control processing.

In some embodiments, the device further includes: a second receiving module, which is configured to receive a data transmission message transmitted by the first network element. The data transmission message carries data identification information for identifying the first network element to the second network element, where the data identification information is used for identifying data transmitted from the first network element to the second network element.

In some embodiments, the device further includes: a third receiving module, which is configured to receive information of the first network element and transmitted by the first network element for assisting the second network element in implementing flow control; and a second processing module, which is configured to perform a flow control processing according to the received information of the first network element for assisting the second network element in implementing the flow control.

In some embodiments, the third transmission module is further configured to transmit the flow control state message to the first network element in at least one of the following manners: the flow control state message is encapsulated in a header of a general packet radio service (GPRS) tunneling protocol-user plane (GTP-U); and the flow control state message is implemented through a control plane interface message.

According to another aspect of the present disclosure, a distributed unit (DU) is provided. The DU includes any one of the flow control device described above.

According to another aspect of the present disclosure, a computer storage medium is further provided. The computer storage medium is further configured to store computer-executable instructions for executing the flow control method provided by one or more technic solutions.

In technical solutions adopted in the embodiments of the present disclosure: the flow control state message transmitted by the second network element connected to the first network element through the fronthaul interface is received, where the flow control state message carries flow control state information for identifying the flow control state of the second network element; and a flow control processing is performed according to the flow control state information. Through interacting the flow control state of the second network element, the flow control processing between the first network element and the second network element which communicate through the fronthaul interface is achieved, effectively solving the problem of how to implement flow control between network elements having different function requirements, thereby ensuring optimal throughput performance according to the reasonable flow control.

BRIEF DESCRIPTION OF THE DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with embodiments. It is to be noted that if not in collision, the embodiments and features therein in the present application may be combined with each other.

It is to be noted that the terms "first," "second" and the like in the description, claims and drawings of the present disclosure are used to distinguish between similar objects and are not necessarily used to describe a particular order or sequence.

Embodiment 1

Figure 1:
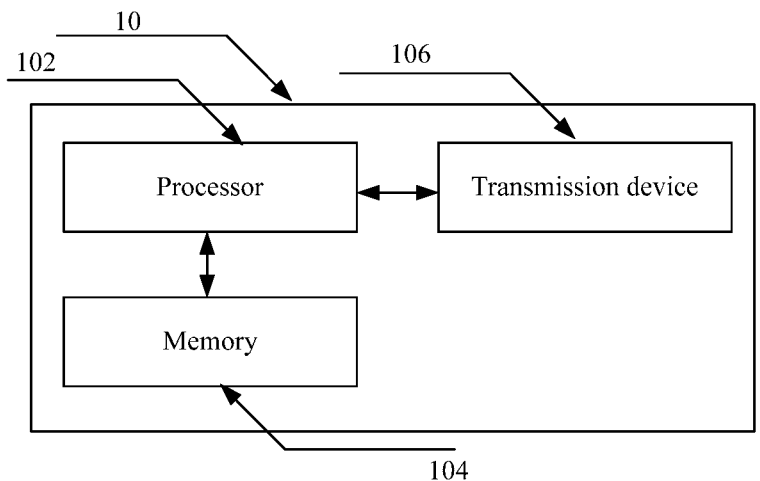
FIG. 1 is a block diagram of a hardware configuration of a mobile terminal for a flow control method according to an embodiment of the present disclosure.

A method embodiment provided by the embodiment one of the present disclosure may be executed in a mobile terminal, a computer terminal or other similar computing apparatuses. An example in which the method is executed in a mobile terminal implementing flow control is described below. FIG. 1 is a block diagram of a hardware configuration of a mobile terminal for executing a flow control method according to an embodiment of the present disclosure. As shown in FIG. 1, a mobile terminal 10 may include one or more (only one is shown in the figure) processors 102 (the processor 102 may include, but is not limited to, a microprocessor MCU, a programmable logic device such as FPGA, or other processing devices), a memory 104 used for storing data, and a transmission device 106 used for implementing a communication function. It should be understood by those skilled in the art that the structure shown in FIG. 1 is merely illustrative, and not intended to limit the structure of the electronic apparatus described above. For example, the mobile terminal 10 may further include more or fewer components than that shown in FIG. 1, or may have a configuration different from the configuration shown in FIG. 1.

The memory 104 may be configured to store software programs of application software, and modules, such as program instructions/modules corresponding to the flow control method in the embodiments of the present disclosure. The processor 102 executes the software programs and modules stored in the memory 104 to perform functional applications and data processing, that is, to implement the method described above. The memory 104 may include a high-speed random access memory, and may further include a nonvolatile memory, such as one or more magnetic storage apparatuses, flash memories or other nonvolatile solid-state memories. In some examples, the memory 104 may further include memories that are remotely disposed with respect to the processor 102. These remote memories may be connected to the mobile terminal 10 via a network. Examples of the network include, but are not limited to, the Internet, an intranet, a local area network, a mobile communication network and a combination thereof.

The transmission device 106 is configured to receive or transmit data via a network. Specific examples of such a network described above may include a wireless network provided by a communication provider of the mobile terminal 10. In one example, the transmission device 106 includes a network interface controller (NIC), which may be connected to other network devices via a base station and thus is capable of communicating with the Internet. In one example, the transmission device 106 may be a radio frequency (RF) module, which is used for communicating with the Internet in a wireless way.

Figure 2:
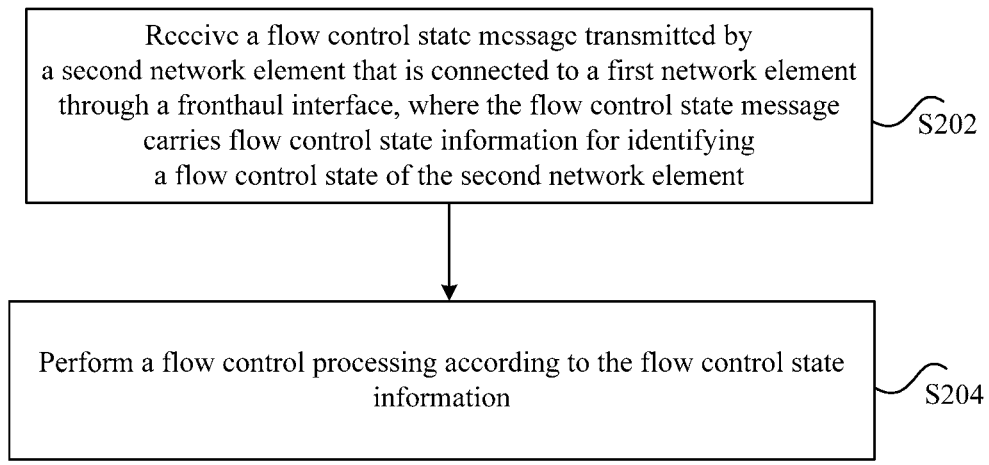
FIG. 2 is a flowchart of a flow control method one according to an embodiment of the present disclosure.

This embodiment provides a flow control method executed on the mobile terminal described above. FIG. 2 is a flowchart of the flow control method one according to the embodiment of the present disclosure. As shown in FIG. 2, the method includes the steps described below.

In step S202, a flow control state message transmitted by a second network element is received, where the second network element is connected to a first network element through a fronthaul interface. The flow control state message carries flow control state information for identifying a flow control state of the second network element.

In step S204, according to the flow control state information, a flow control processing is performed.

Through performing the above steps, the flow control state of the second network element is acquired, the flow control processing between the first network element and the second network element can be implemented through the fronthaul interface. Further, through performing the steps, the problem of how to implement flow control between network elements having different function requirements is effectively solved, thereby ensuring optimal throughput performance according to the reasonable flow control.

In some embodiments, the first network element and the second network element are two network elements connected through an X2 interface. In this case, the first network element and the second network element both may be a base station, such as an evolved NodeB (eNB).

In other embodiments, the first network element and the second network element may have different functions. For example, the first network element and the second network element are two network elements connected through an S1 interface. For example, the first network element may be a base station and the second network element may be a gateway, or the first network element is a network element and the second network element is the base station.

In some embodiments, before receiving the flow control state message transmitted by the second network element that is connected to the first network element through the fronthaul interface, the method further includes: transmitting a data transmission message to the second network element. The data transmission message carries data identification information for identifying data transmitted to the second network element by the first network element. The data identification information may include at least one of the following: a data packet serial number for identifying the transmitted data, and packet retransmission indication information for identifying whether the transmitted data is retransmission data.

In some embodiments, before receiving the flow control state message transmitted by the second network element connected to the first network element through the fronthaul interface, the method may further include: transmitting, to the second network element, information of the first network element for assisting the second network element in implementing the flow control. The information of the first network element for assisting the second network element in implementing flow control includes at least one of: a buffer size of the first network element, a buffer size provided by the first network element based on user equipment capability, and request information by which the first network element requests the second network element to report the flow control state of the second network element.

The buffer size in this embodiment may include a buffer capacity provided by the buffer.

The flow control state message transmitted by the second network element connected to the first network element through the fronthaul interface may be received in multiple manners. For example, the flow control state message transmitted by the second network element connected to the first network element through the fronthaul interface may be received in at least one of the following manners: the flow control state message is encapsulated in in a header of a general packet radio service (GPRS) tunneling protocol-user plane (GTP-U); and the flow control state message is implemented through a control plane interface message.

It is noted that the flow control state information may include at least one of: identification information of a data packet received by the second network element from the first network element and successfully transmitted to a UE by the second network element; the desired size of a buffer for a protocol data unit (PDU) session of the second network element; the desired size of a buffer for a data flow of the second network element; the desired size of a buffer for a radio bearer (RB) of the second network element; the desired size of a buffer of the second network element based on numerology (parameter configuration of a physical layer); the desired size of a buffer of the second network element based on a network slice; the minimum desired size of a UE-level buffer; identification information that is notified to the first network element and indicates a data packet lost in the second network element; a second network element congestion indication for indicating congestion of the second network element; an overall available buffer size of the second network element; or a flow control indication transmitted by the second network element to the first network element.

Figure 3:
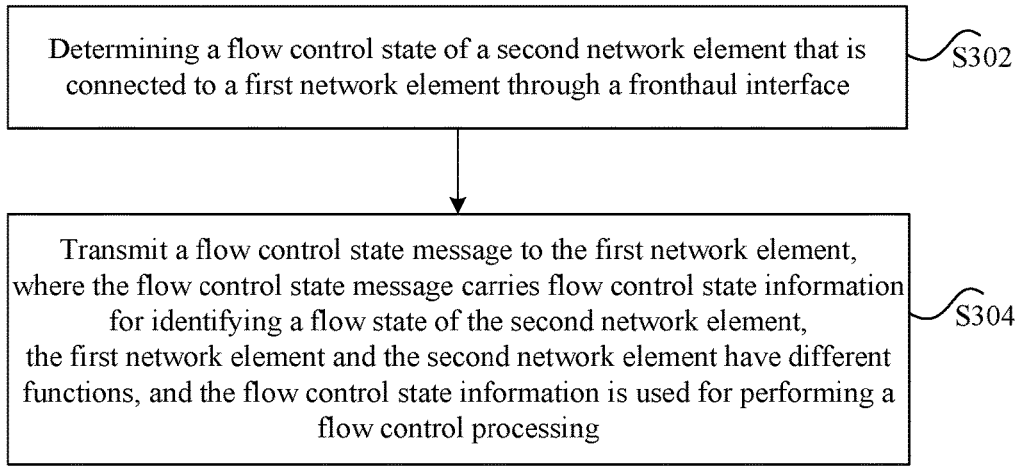
FIG. 3 is a flowchart of a flow control method two according to an embodiment of the present disclosure.

FIG. 3 is a flowchart of a flow control method two according to an embodiment of the present disclosure. As shown in FIG. 3, the method includes the following steps.

In step S302, a flow control state of a second network element connected to a first network element through a fronthaul interface is determined.

In step S304, a flow control state message is transmitted to the first network element, where the flow control state message carries flow control state information for identifying a flow state of the second network element. The first network element and the second network element are configured with different functions, and the flow control state information is used for performing a flow control processing.

Through the above steps, the flow control state of the second network element is interacted, the flow control processing between the first network element and the second network element which communicate through the fronthaul interface is implemented, the problem of how to implement flow control between network elements having different function requirements is effectively solved, thereby ensuring optimal throughput performance according to the reasonable flow control.

In some embodiments, before determining the flow control state of the second network element connected to the first network element through the fronthaul interface, the method further includes: receiving a data transmission message transmitted by the first network element. The data transmission message carries data identification information for identifying data transmitted to the second network element by the first network element. The data identification information may include at least one of the following: a data packet serial number for identifying the transmitted data, and packet retransmission indication information for identifying whether the transmitted data is retransmission data.

In some embodiments, before determining the flow control state of the second network element connected to the first network element through the fronthaul interface, the method may further include: receiving information of the first network element transmitted by the first network element, where the information of the first network element is used for assisting the second network element in implementing flow control; and performing the flow control according to the received information of the first network element for assisting the second network element in implementing the flow control. The information of the first network element for assisting the second network element in implementing flow control may include at least one of: the size of a buffer of the first network element, the size of a buffer provided by the first network element based on user equipment capability, and request information through which the first network element requests the second network element to report the flow control state of the second network element.

Correspondingly, the flow control state message may be transmitted to the first network element in multiple manners. For example, the flow control state message may be transmitted to the first network element in at least one of the following manners: the flow control state message is encapsulated in a header of a general packet radio service (GPRS) tunneling protocol-user plane (GTP-U); and the flow control state message is implemented through a control plane interface message.

It is noted that the flow control state information may include at least one of: the identification information of a data packet received by the second network element from the first network element and successfully transmitted to a UE by the second network element; the desired size of a buffer of a protocol data unit (PDU) session of the second network element; the desired size of a buffer of a data flow of the second network element; the desired size of a buffer of a radio bearer (RB) of the second network element; the desired size of a buffer of the second network element based on numerology (parameter configuration of a physical layer); the desired size of a buffer of the second network element based on a network slice; the minimum UE-level desired buffer size; identification information that is transmitted the first network element for identifying a data packet lost in the second network element; a second network element congestion indication for indicating congestion of the second network element; an overall available buffer size of the second network element; or a flow control indication transmitted by the second network element to the first network element.

Figure 4:
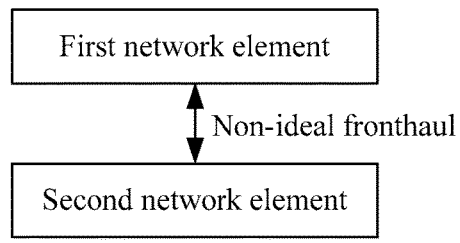
FIG. 4 is a schematic diagram of a fronthaul interface between a first network element and a second network element according to an embodiment of the present disclosure.

Since the above problem exists in the related art, in 5G the division mode of the fronthaul interface is redefined. The division mode of the fronthaul is based on aspects such as transmission capacity, transmission delay, and deployment convenience. For example, for non-ideal fronthaul transmission, network functions that are not sensitive to delay are placed in the first network element (such as a central unit (CU)), network functions that are sensitive to delay are placed in the second network element (such as a distributed unit (DU)). The first network element and the second network element perform transmission through ideal fronthaul and/or non-ideal fronthaul. The interface is called the fronthaul interface. FIG. 4 is a schematic diagram of a fronthaul interface between a first network element and a second network element according to an embodiment of the present disclosure. As shown in FIG. 4, the first network element and the second network element perform information interaction through the fronthaul interface. For different delays, the fronthaul here may be the ideal fronthaul or non-ideal fronthaul. The ideal fronthaul has a relatively small transmission delay of, for example, tens or hundreds of microseconds. The non-ideal fronthaul has a relatively large transmission delay of, for example, milliseconds. The distinction between the ideal fronthaul and the non-ideal fronthaul causes that the first network element and the second network element have different functions.

A first protocol entity (such as a radio resource control entity) may be located in the first network element. The first protocol entity generates control signaling, maintains establishment and/or modification and/or release of the radio bearer, maintains parameter updating of a second protocol entity, a third protocol entity, a fourth protocol entity and a physical layer. The second protocol entity has a function similar to a packet data convergence protocol (PDCP) of the LTE system and an enhanced function, the third protocol entity has a function similar to radio link control (RLC) of the LTE system and an enhanced function, and the fourth protocol entity has a function similar to medium access control (MAC) of the LTE system and an enhanced function. The second network element includes at least one of: the second protocol entity, the third protocol entity, the fourth protocol entity, the physical layer and a radio frequency unit. The first network element and the second network element communicate with each other through the fronthaul interface.

Figure 5:
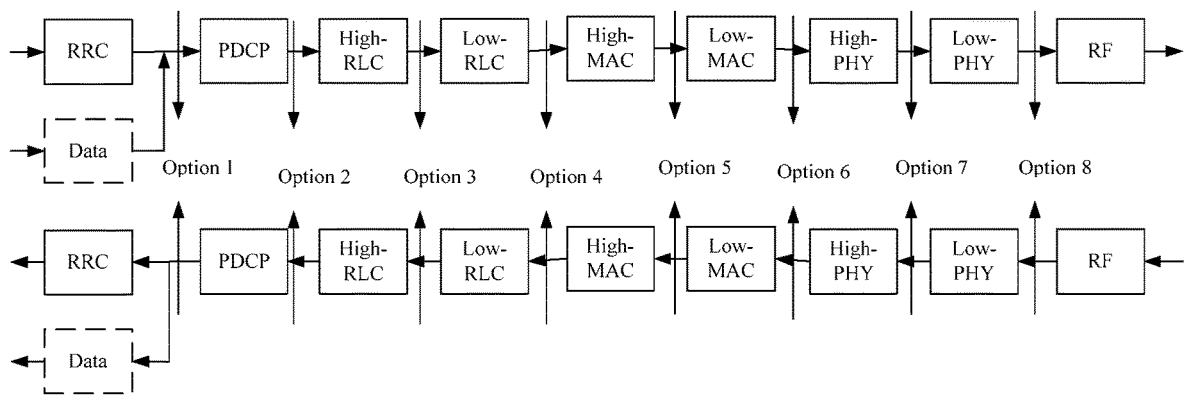
FIG. 5 is a schematic diagram of possible function splitting between a first network element and a second network element according to an embodiment of the present disclosure.

FIG. 5 is a schematic diagram showing possible function splitting between a first network element and a second network element according to an embodiment of the present disclosure. As shown in FIG. 5, the possible function splitting is described below.

Option 1 (RRC/PDCP Split, 1A-Like Structure)

The function splitting in this option is similar to the 1A structure in dual connectivity (DC). RRC is in the CU, and functions such as PDCP, RLC, MAC, PHY and RF are in the DU, thus the entire user plane (UP) is in the DU.

Option 2 (PDCP/RLC Split)

The function splitting in this option is similar to a 3C structure in dual connectivity (DC). RRC and PDCP are located in the CU, and functions such as RLC, MAC, PHY and RF are located in the DU.

Option 3 (High RLC/Low RLC Split)

RLC sublayer (part of functions of RLC), MAC, PHY and part of RF are location in the DU, and functions such as RRC, PDCP, RLC higher layer (part of functions of RLC) are located in the CU.

Option 4 (RLC-MAC Split)

MAC, PHY and part of RF are located in the DU, and functions such as RRC, PDCP and RLC are located in the CU.

Option 5 (Intra MAC Split)

Part of MAC functions (such as HARQ), PHY and part of RF are located in the DU, and other higher layer functions are located in the CU.

Option 6 (MAC-PHY Split)

PHY and part of RF are located in the DU, and functions such as MAC, PDCP and RLC are located in the CU.

Option 7 (Intra PHY Split)

Part of PHY functions (such as HARQ), PHY and part of RF are located in the DU, and other higher layer functions are located in the CU.

Option 8 (PHY-RF Split)

Part of RF is located in the DU, and other higher layer functions are located in the CU.

Under a CU-DU split network architecture, the CU may be connected to multiple DUs. When the data of the CU needs to be transmitted to the UE through the DU, the data transmission may be implemented through multiple DUs. In a CU side routing selection, the data flow is split in a CU PDCP layer or a RLC layer, and flows to different DUs through different branches. In this case, data amounts of data flowing to different DU need to be controlled, that is, a reasonable flow control strategy is desired to ensure the optimal throughput performance.

Based on the above requirements, in this embodiment, a flow control implementation method is provided. The method includes the steps described below.

In step 1, a first network element transmits a data transmission message to a second network element, and informs the second network element of a serial number of a data packet that is transmitted through a NGx-U, and the second network element saves the information for detecting data packet loss on the fronthaul interface. In some embodiments, the information transmitted by the first network element to the second network element further includes: a packet retransmission indication for indicating whether the currently transmitted data packet is a retransmission data package.

In step 2, the second network element transmits to the first network element a flow control state message. The flow control message includes, but is not limited to, one or more of the following information: the corresponding serial number of a highest data packet among data packets which are received by the second network element from the first network element and successfully transmitted to a UE by the second network element; the desired buffer size corresponding to a PDU session or a data flow or a RB, which is in units of BYTE; the minimum UE-level desired buffer size which is in units of BYTE; information for notifying the first network element of a data packet lost by the second network element on NGx-U, for example, the information may be represented in a serial number range of the lost data package; a second network element congestion indication; an overall available buffer size of the second network element; and a flow control indication transmitted by the second network element to the first network element. The flow control indication includes reducing data transmission, increasing the data transmission and maintaining the data transmission.

In some embodiments, before the step 2, the second network element may further receive information transmitted by the first network element used for flow control on a first network element side. The information includes, but is not limited to, one or more of: a buffer size of the first network element itself (here the buffer may be one or more: the current used UE/PDU session/data flow/RB-level buffer size); and an instruction through which the first network element requests the second network element to report flow control state information on a DU side.

In some embodiments, the above first network element may be the CU, the above second network element may be the DU.

In some embodiments, according to different CU-DU split manner, the above data packet includes, but is not limited to, a second protocol entity data packet and a third protocol entity data packet.

In some embodiments, the above data packet serial number may be one of: a PDCP SN number, a RLC SN number and a pre-defined user plane interface serial number.

In some embodiments, a user plane interface between the above first network element and the above second network element may be based on a transmission protocol, which is the general packet radio service tunneling protocol for the user plane (GTP-U), the flow control message may be encapsulated in a header of the GTP-U.

In some embodiments, the flow control message between the first network element and the second network element may also be implemented through a NGx-C interface message.

Through the flow control implementation method provided by the above embodiments, the flow control management on the interface between the first network element and the second network element is implemented, the optimal throughput performance is ensured by using the reasonable flow control strategies, and the retransmission data packet is indicated for being processed differently.

The optional embodiments of the present disclosure will be described below in conjunction with the above embodiments.

An Aspect of Embodiment 1

Figure 6:
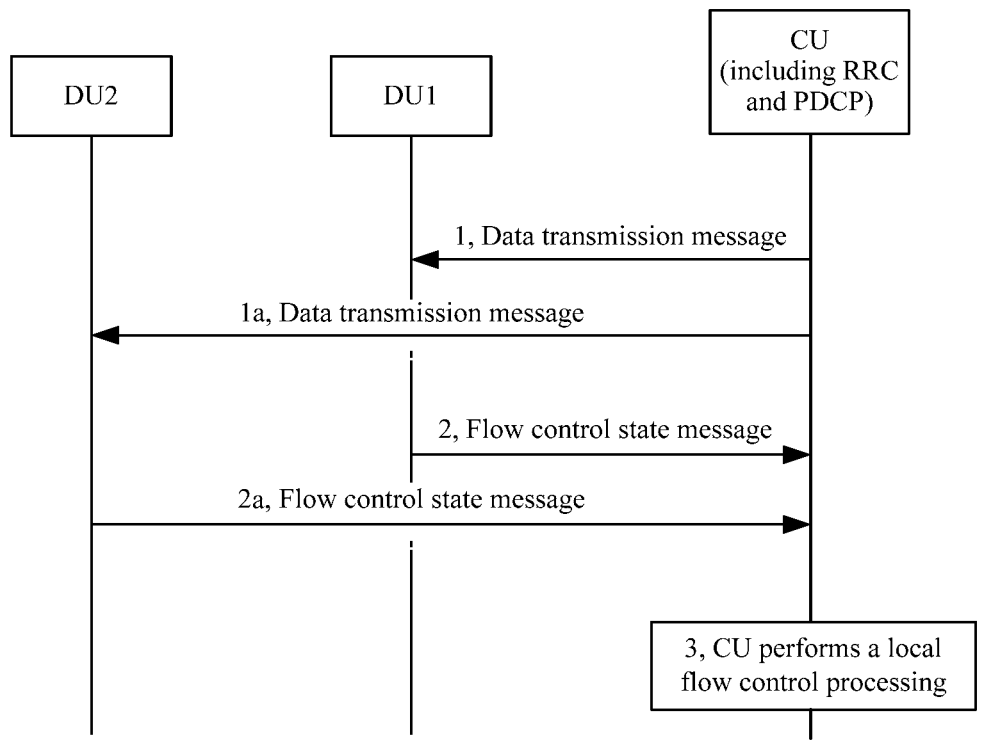
FIG. 6 is a flowchart one of implementing flow control between a first network element and a second network element according to an optional embodiment of the present disclosure.

FIG. 6 is a flowchart one of implementing flow control between a first network element and a second network element according to an optional embodiment of the present disclosure. As shown in FIG. 6, the first network element is a CU, the second network element is a DU, and an interface between the CU and the DU is referred to as a NGx interface; a NGx-C is a fronthaul interface control plane and a NGx-U is a fronthaul interface user plane.

In step 1 or 1*a*: the CU transmits a data transmission message to the DU to inform the DU of serial number information of a data packet transmitted by the current NGx-U. The data packet serial number may be a PDCP SN number or a new-defined serial number. The DU needs to store the serial numbers of the transmitted data packets, which may be used for a data packet loss detection on the fronthaul interface.

In step 2 or 2*a*: the DU transmits a flow control state message to the CU, the triggering of the flow control message is decided by the DU. If multiple DUs are connected to one CU and serve for UE, the multiple DUs transmit the flow control state message to the CU. The message includes, but is not limited to, one or more of: the highest SN among the PDCP PDUs which are received by the DU from the CU and successfully transmitted to the UE; the desired buffer size corresponding to a PDU session or a data flow or a RB, the buffer size is in units of BYTE; the minimum UE-level desired buffer size which is in units of BYTE; notifying the CU of relevant information of NGx-U data packet lost in the DU; a DU congestion indication; an overall available buffer size of the DU; a flow control indication, including reducing data transmission, increasing the data transmission and maintaining the data transmission;

In step 3, the CU performs a local flow control management according to flow control state information transmitted by the DU.

Another Aspect of Embodiment 1

Figure 7:
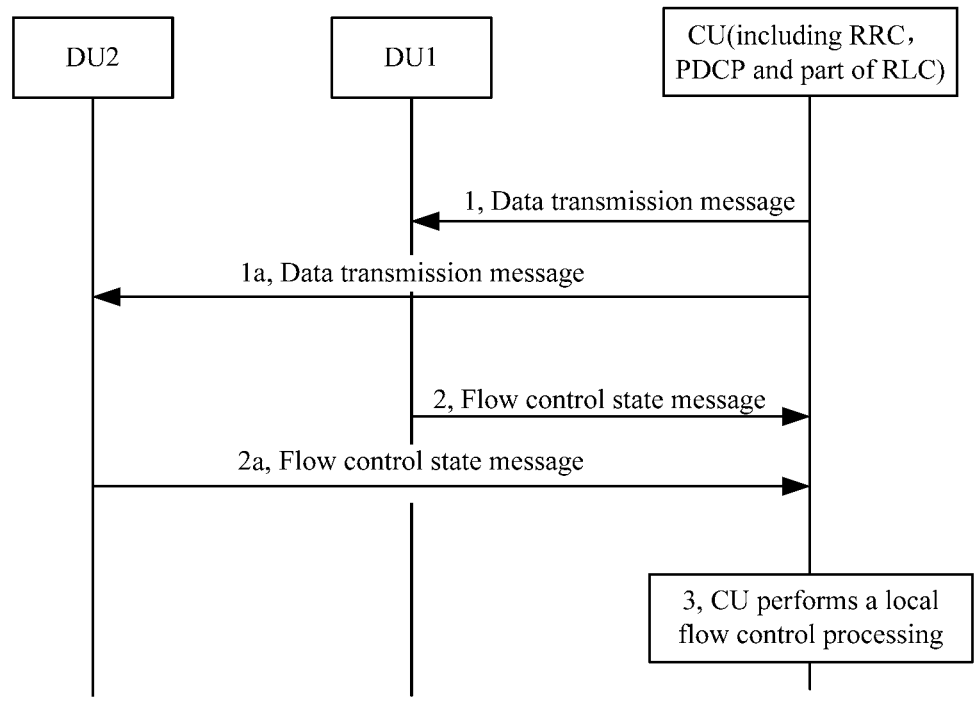
FIG. 7 is a flowchart two of implementing flow control between a first network element and a second network element according to an optional embodiment of the present disclosure.

FIG. 7 is a flowchart two of implementing flow control between a first network element and a second network element according to an optional embodiment of the present disclosure. As shown in FIG. 7, the first network element is a CU, the second network element is a DU, and the interface between the CU and the DU is referred to as the NGx interface. The NGx-C is a fronthaul interface control plane and the NGx-U is a fronthaul interface user plane.

In step 1 or 1*a*: the CU transmits a data transmission message to the DU to inform the DU about serial number information of a data packet transmitted from the current NGx-U. The data packet serial number may be a RLC SN number or a new-defined serial number. The DU needs to store the serial numbers of the transmitted data packets, which may be used for a data packet loss detection on the fronthaul interface. It may further include a packet retransmission indication. The packet retransmission indication is used for indicating whether this data packet is a retransmission RLC PDU.

In step 2 or 2*a*: the DU transmits a flow control state message to the CU, and the triggering of the flow control message is decided by the DU. If multiple DUs are connected to one CU and serve for the UE, the multiple DUs transmit the flow control state message to the CU. The message includes, but is not limited to, one or more of: the highest SN among RLC PDUs which are received by the DU from the CU and successfully transmitted to the UE; the desired buffer size corresponding to a PDU session or a data flow or a RB, the buffer size is in units of BYTE; the minimum UE-level desired buffer size which is in units of BYTE; notifying the CU of relevant information of the NGx-U data packet lost in the DU; a DU congestion indication; an overall available buffer size of the DU; a flow control indication. The flow control indication may include reducing data transmission, increasing the data transmission and maintaining the data transmission.

In step 3, the CU performs a local flow control management according to flow control state information transmitted by the DU.

Yet Another Aspect of Embodiment 1

Figure 8:
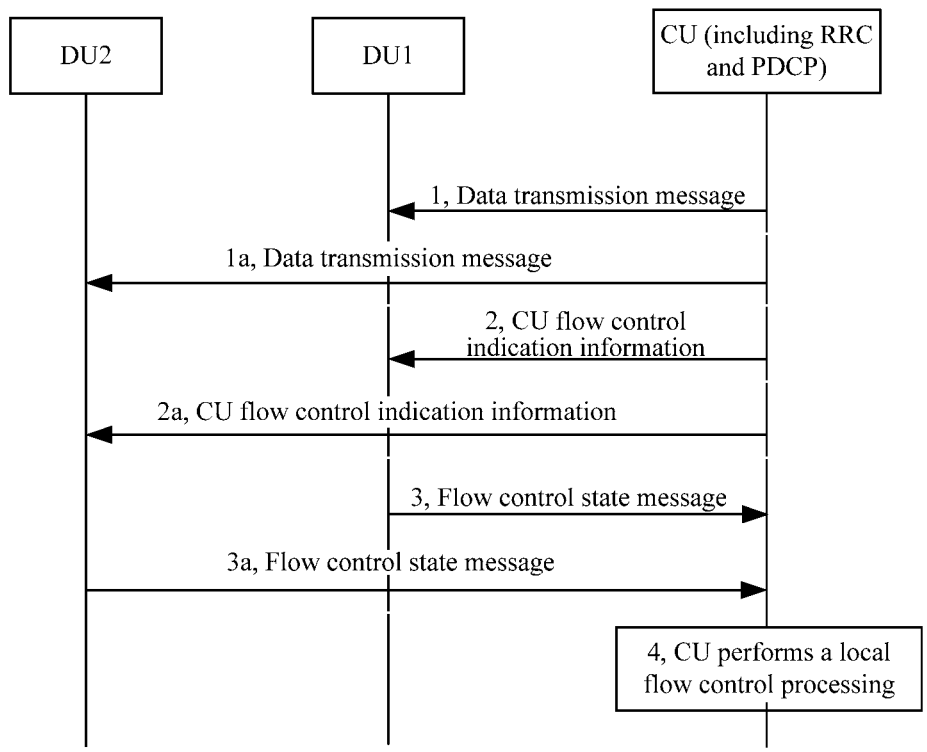
FIG. 8 is a flowchart three of implementing flow control between a first network element and a second network element according to an optional embodiment of the present disclosure.

FIG. 8 is a flowchart three of implementing flow control between a first network element and a second network element according to an optional embodiment of the present disclosure. As shown in FIG. 8, the first network element is a CU, the second network element is a DU, and an interface between the CU and the DU is referred to as a NGx interface. NGx-C is a fronthaul interface control plane and NGx-U is a fronthaul interface user plane.

In step 1 or 1a: the CU transmits a data transmission message to the DU to inform the DU of serial number information of the data packet transmitted from the current NGx-U to the DU. The data packet serial number may be a PDCP SN number or a new-defined serial number. The DU needs to store the serial number of the transmitted data packet, which may be used for a data packet loss detection on the fronthaul interface.

In step 2 or 2a: the DU may receive CU-side flow control information transmitted by the CU. The information includes, but is not limited to, one or more of: a buffer size of the CU itself (here the buffer may be one or more of: the current used UE/PDU session/data flow/RB-level buffer size; and an instruction through which the CU requests the DU to report DU-side flow control state information.

In step 3 or 3a, the DU may perform a local processing according to the flow control information transmitted by the CU. Meanwhile, the DU may also transmit flow control state information to the CU, the message includes, but is not limited to, one or more of: the highest SN among PDCP PDUs which are received by the DU from the CU and successfully transmitted to the UE; the desired buffer size corresponding to a PDU session or a data flow or a RB, which is in units of BYTE; the minimum UE-level desired buffer size which is in units of BYTE; notifying the CU of relevant information of the NGx-U data packet lost in the DU; a DU congestion indication; an overall available buffer size of the DU; and a flow control indication. The flow control indication includes: reducing data transmission, increasing the data transmission and maintaining the data transmission;

In step 4, the CU performs a local flow control management according to flow control state information transmitted by the DU.

Yet Another Aspect of Embodiment 1

Figure 9:
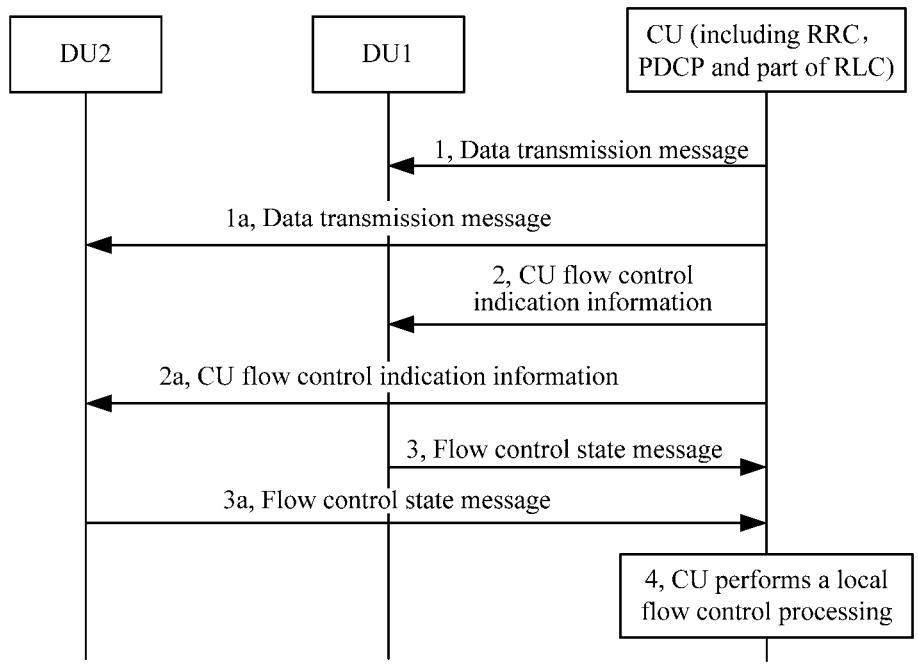
FIG. 9 is a flowchart four of implementing flow control between a first network element and a second network element according to an optional embodiment of the present disclosure.

FIG. 9 is a flowchart four of implementing flow control between a first network element and a second network element according to an optional embodiment of the present disclosure. As shown in FIG. 9, the first network element is a CU, the second network element is a DU, and an interface between the CU and the DU is referred to as a NGx interface; a NGx-C is a fronthaul interface control plane and a NGx-U is a fronthaul interface user plane.

In step 1 or 1a: the CU transmits a data transmission message to the DU to inform the Du of serial number information of a data packet transmitted from the current NGx-U. The data packet serial number may be a RLC SN number or a new-defined serial number. The DU needs to store the serial number of the transmitted data packet, which may be used for a data packet loss detection on the fronthaul interface. A packet retransmission indication may also be included. The packet retransmission indication is used for indicating whether this data packet is a retransmission RLC PDU.

In step 2 or 2a: the DU may receive CU-side flow control information transmitted by the CU. The information includes, but is not limited to, one or more of the following information: a buffer size of the CU itself (here the buffer may be one or more of: the current used UE/PDU session/data flow/RB-level buffer size; and an indication that the CU requests the DU to report the DU-side flow control state information.

In step 3 or 3a, the DU may perform a local processing according to the flow control information transmitted by the CU. Meanwhile, the DU may also transmit flow control state information to the CU, and the flow control state information includes, but is not limited to, one or more of: the highest SN among RLC PDUs which are received by the DU from the CU and successfully transmitted to the UE; the desired buffer size corresponding to a PDU session or a data flow or a RB, which is in units of BYTE; the minimum UE-level desired buffer size which is in units of BYTE; notifying the CU of relevant information of a NGx-U data packet lost in the DU; a DU congestion indication; an overall available buffer size of the DU; and a flow control indication. The flow control indication includes reducing data transmission, increasing the data transmission and maintaining the data transmission.

In step 4, the CU performs, according to flow control state information transmitted by the DU, a local flow control management.

It is noted that in the above optional embodiments, a user plane interface between the CU and the DU may be based on a GTP-U transmission protocol, the flow control message may be encapsulated in a header of the GTP-U. The flow control message may also be implemented through a control plane interface message.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solution provided by the present invention substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, etc.) to execute the method according to each embodiment of the present invention.

Embodiment 2

This embodiment provides a flow control device. The device is used for implementing the embodiments and optional embodiments described above. What has been described is not repeated herein. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 10:
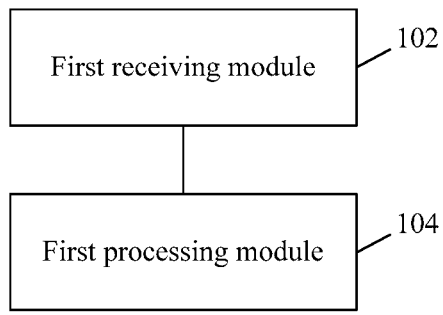
FIG. 10 is a block diagram of a flow control apparatus one according to an embodiment of the present disclosure.

FIG. 10 is a block diagram of a flow control device one according to an embodiment of the present disclosure. As shown in FIG. 10, the device includes a first receiving module 102 and a first processing module 104. The device is described below.

The first receiving module 102 is configured to receive a flow control state message transmitted by a second network element connected to a first network element through a fronthaul interface, where the flow control state message carries flow control state information for identifying a flow control state of the second network element. The first processing module 104 is connected to the first receiving module 102 and configured to perform, according to the flow control state information, a flow control processing. In some embodiments, the first network element and the second network element have different functions.

Figure 11:
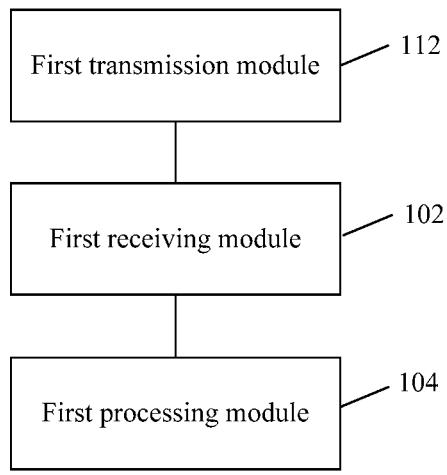
FIG. 11 is an optional block diagram one of the flow control apparatus one according to an embodiment of the present disclosure.

FIG. 11 is an optional block diagram one of the flow control device one according to an embodiment of the present disclosure. As shown in FIG. 11, in addition to all modules shown in FIG. 10, the device further includes a first transmission module 12. The device is described below.

The first transmission module 112 is connected to the above first receiving module 102 and configured to transmit a data transmission message to the second network element, where the data transmission message carries data identification information for identifying data transmitted from the first network element to the second network element.

Figure 12:
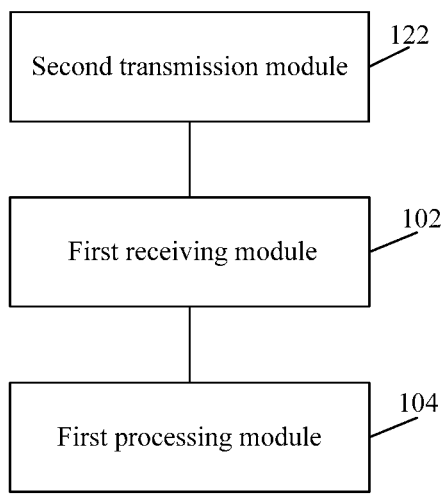
FIG. 12 is an optional block diagram two of the flow control apparatus one according to an embodiment of the present disclosure.

FIG. 12 is an optional block diagram two of the flow control device one according to an embodiment of the present disclosure. As shown in FIG. 12, in addition to all modules shown in FIG. 10, the device further includes a second transmission module 122. The device is described below.

The second transmission module 122 is connected to the first receiving module 102, and is configured to transmit, to the second network element, information of the first network element for assisting the second network element in implementing flow control.

In some embodiments, the first receiving module 102 is further configured to receive the flow control state message transmitted by the second network element connected to the first network element through the fronthaul interface in at least one of the following manners: the flow control state message is encapsulated in a header of a general packet radio service (GPRS) tunneling protocol-user plane GTP-U; and the flow control state message is implemented through a control plane interface message.

Figure 13:
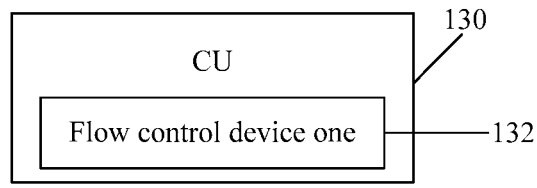
FIG. 13 is a diagram of a CU according to an embodiment of the present disclosure.

FIG. 13 shows a CU according to an embodiment of the present disclosure. As shown in FIG. 13, the CU 130 includes any one of the flow control device one 132 described above.

In this embodiment, the CU may further include, in addition to including the above flow control device, a memory. The memory may be connected to the flow control device for storing information, for example, the memory may be further used for storing various kinds of information interacted by the flow control device with different network elements.

Figure 14:
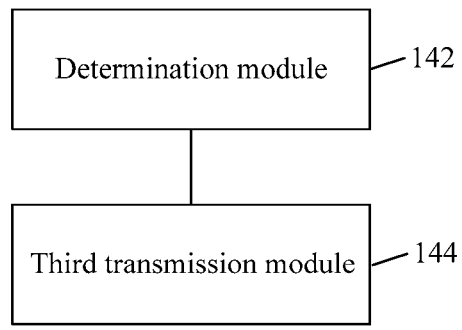
FIG. 14 is a block diagram of a flow control apparatus two according to an embodiment of the present disclosure.

FIG. 14 is a block diagram of a flow control device two according to an embodiment of the present disclosure. As shown in FIG. 14, the device includes a determination module 142 and a third transmission module 144. The device is described below.

The determination module 142 is configured to determine a flow control state of a second network element connected to a first network element through a fronthaul interface. The third transmission module 144 is connected to the determination module 142 and configured to transmit a flow control message to the first network element, where the flow control state message carries flow control state information for identifying the flow control state of the second network element. The flow control state information is used for performing a flow control processing. In some embodiments, the first network element and the second network element have different functions.

Figure 15:
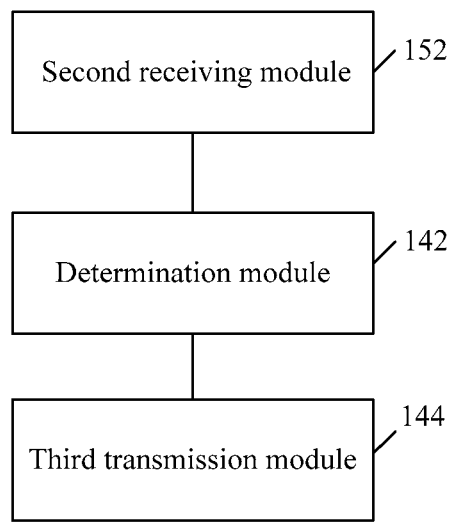
FIG. 15 is an optional block diagram one of the flow control apparatus two according to an embodiment of the present disclosure.

FIG. 15 is an optional block diagram one of the flow control device two according to an embodiment of the present disclosure. As shown in FIG. 15, in addition to all modules shown in FIG. 14, the device further includes a second receiving module 152. The second receiving module 152 is described below.

The second receiving module 152 is connected to the above determination module 142 and configured to receive a data transmission message transmitted by the first network element, where the data transmission message carries data identification information identifying data transmitted from the first network element to the second network element.

Figure 16:
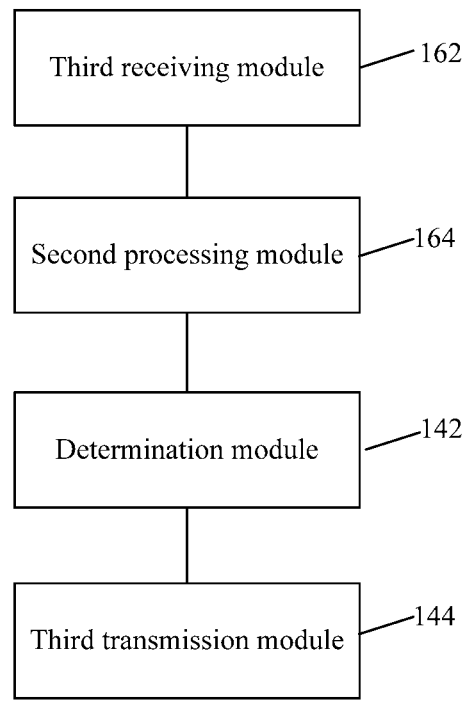
FIG. 16 is an optional block diagram two of the flow control apparatus two according to an embodiment of the present disclosure.

FIG. 16 is an optional block diagram two of the flow control device two according to an embodiment of the present disclosure. As shown in FIG. 16, in addition to all modules shown in FIG. 14, the device further includes a third receiving module 162 and a second processing module 164. The optional structure is described below.

The third receiving module 162 is configured to receive information of the first network element transmitted by the first network element for assisting the second network element in implementing flow control. The second processing module 164 is connected to the above third receiving module 162 and the determination module 142, and is configured to perform a flow control processing according to the received information of the first network element for assisting the second network element in implementing the flow control.

In some embodiments, the third transmission module 144 is further configured to transmit the flow control state message to the first network element in at least one of the following manners: the flow control state message is encapsulated in a header of the general packet radio service (GPRS) tunneling protocol for user plane (GTP-U); and the flow control state message is a control plane interface message.

Figure 17:
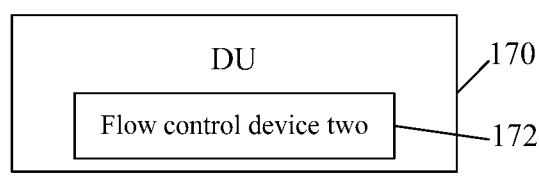
FIG. 17 is a block diagram of a DU according to an embodiment of the present disclosure.

FIG. 17 shows a DU according to an embodiment of the present disclosure. As shown in FIG. 17, the DU 170 includes any one of the flow control device two 172 described above.

In this embodiment, in addition to the above flow control device, the DU may further include a memory. The memory may be connected to the flow control device for storing information, for example, the memory may be further used for storing various kinds of information interacted by the flow control device with different network elements.

It is to be noted that the various modules described above may be implemented by software or hardware. Implementation of hardware may, but may not necessarily, be achieved in the following manners: the various modules described above are located in a same processor, or the various modules described above are located in different processors in any combination form.

An embodiment of the present disclosure further provides a computer storage medium. In some embodiments, in this embodiment, the above storage medium may be configured to store computer-executable instructions such as program codes for executing the steps described below.

In step S1, a flow control state message transmitted by a second network element connected to a first network element through a fronthaul interface is received. The flow control state message carries flow control state information for identifying a flow control state of the second network element. The first network element and the second network element have different functions.

In step S2, according to the flow control state information, a flow control processing is performed.

In some embodiments, the storage medium is further configured to store program codes for executing a step described below.

Before receiving the flow control state message transmitted by the second network element connected to the first network element through the fronthaul interface, the method further includes the step described below.

In step S1, a data transmission message is transmitted to the second network element, where the data transmission message carries data identification information for identifying data transmitted from the first network element to the second network element.

In some embodiments, the storage medium is further configured to store program codes for executing a step described below.

In step S1, the data identification information may include at least one of: a data packet serial number for identifying the transmitted data, and packet retransmission indication information for identifying whether the transmitted data is retransmission data.

In some embodiments, the storage medium is further configured to store program codes for executing a step described below.

Before receiving the flow control state message transmitted by the second network element connected to the first network element through the fronthaul interface, the method further includes a step described below.

In step S1, information of the first network element for assisting the second network element in implementing flow control is transmitted to the second network element.

In some embodiments, the storage medium is further configured to store program codes for executing a step described below.

In step S1, the information of the first network element for assisting the second network element in implementing flow control may include at least one of: a buffer size of the first network element, a buffer size provided by the first network element based on user equipment capability, request information through which the first network element requests the second network element to report a flow control state of the second network element.

In some embodiments, the storage medium is further configured to store program codes for executing a step described below.

In step S1, the flow control state message transmitted by the second network element connected to the first network element through the fronthaul interface is received in at least one of the following manners: the flow control state message is encapsulated in a header of a general packet radio service (GPRS) tunneling protocol for user plane (GTP-U); and the flow control state message is implemented through a control plane interface message.

In some embodiments, the storage medium is further configured to store program codes for executing a step described below.

In step S1, the flow control state information includes at least one of: identification information of a data packet received by the second network element from the first network element and successfully transmitted to the UE; a desired buffer size of a protocol data unit (PDU) session in the second network element; a desired buffer size of a data flow in the second network element; a desired buffer size of a radio bearer (RB) in the second network element; a desired buffer size of the second network element based on numerology (a physical layer parameter configuration); a desired buffer size of the second network element based on a network slice; a minimum UE-level desired buffer size; identification information for notifying the first network element of a data packet lost in the second network element; a second network element congestion indication for indicating congestion of the second network element; an overall available buffer size of the second network element; and a flow control indication transmitted by the second network element to the first network element.

According to another embodiment of the present disclosure, a storage medium is further provided. The storage medium is configured to store program codes for executing the steps described below.

In step S1, a flow control state of a second network element is determined, where the second network element is connected to a first network element through a fronthaul interface.

In step S2, a flow control state message is transmitted to the first network element, where the flow control state message carries flow control state information for identifying the flow state of the second network element. The first network element and the second network element have different functions, and the flow control state information is used for performing a flow control processing.

In some embodiments, the storage medium is further configured to store program codes for executing a step described below.

Before determining the flow control state of the second network element connected to the first network element through the fronthaul interface, the storage medium further includes a step described below.

In step S1, a data transmission message transmitted by the first network element is received, where the data transmission message carries data identification information for identifying data transmitted from the first network element to the second network element.

In some embodiments, the storage medium is further configured to store program codes for executing a step described below.

In step S1, the data identification information may include at least one of the following: a data packet serial number for identifying the transmitted data, and packet retransmission indication information for identifying whether the transmitted data is retransmission data.

In some embodiments, the storage medium is further configured to store program codes for executing a step described below.

Before determining the flow control state of the second network element connected to the first network element through the fronthaul interface, the method further includes a step described below.

In step S1, information of the first network element transmitted by the first network element for assisting the second network element in implementing flow control is received; and a flow control processing is performed according to the received information of the first network element for assisting the second network element in implementing the flow control.

In some embodiments, the storage medium is further configured to store program codes for executing a step described below.

In step S1, the information of the first network element for assisting the second network element in implementing flow control may include at least one of: a buffer size of the first network element, a buffer size provided by the first network element based on user equipment capability, request information through which the first network element requests the second network element to report a flow control state of the second network element.

In some embodiments, the storage medium is further configured to store program codes for executing a step described below.

In step S1, the flow control state message is transmitted to the first network element in at least one of the following manners: the flow control state message is encapsulated in a header of a general packet radio service (GPRS) tunneling protocol for user plane (GTP-U); and the flow control state message is implemented through a control plane interface message.

In some embodiments, the storage medium is further configured to store program codes for executing a step described below.

In step S1, the flow control state information includes at least one of: identification information of a data packet received by the second network element from the first network element and successfully transmitted to a UE; a desired buffer size of a protocol data unit (PDU) session in the second network element; a desired buffer size of a data flow in the second network element; a desired buffer size in a radio bearer (RB) in the second network element; a desired buffer size of the second network element based on numerology (a physical layer parameter configuration); a desired buffer size of the second network element based on a network slice; a minimum UE-level desired buffer size; identification information notifying the first network element of a data package lost in the second network element; a second network element congestion indication for indicating congestion of the second network element; an overall available buffer size of the second network element; and a flow control indication transmitted by the second network element to the first network element.

In some embodiments, in the embodiment, the storage medium may include, but is not limited to, a USB flash disk, a read-only memory (ROM), a random access memory (RAM), a mobile hard disk, a magnetic disk, an optical disk or another medium capable of storing program codes.

In some embodiments, in this embodiment, the processor executes according to the program codes stored in the storage medium: receiving the flow control state message transmitted by the second network element connected to the first network element through the fronthaul interface; and performing the flow control processing according to the flow control state information. The flow control state message carries flow control state information for identifying the flow control state of the second network element, and the first network element and the second network element have different functions.

In some embodiments, in this embodiment, the processor executes according to the program codes stored in the storage medium that before receiving the flow control state message transmitted by the second network element connected to the first network element through the fronthaul interface, the method further includes: transmitting a data transmission message to the second network element, where the data transmission message carries data identification information for identifying data transmitted to the second network element by the first network element.

In some embodiments, in this embodiment, the processor executes according to the program codes stored in the storage medium that the data identification information includes at least one of: a data packet serial number for identifying the transmitted data, and packet retransmission indication information for identifying whether the transmitted data is retransmission data.

In some embodiments, in this embodiment, the processor executes according to the program codes stored in the storage medium that before receiving the flow control state message transmitted by the second network element connected to the first network element through the fronthaul interface, the method further includes: transmitting information of the first network element to the second network element for assisting the second network element in implementing the flow control.

In some embodiments, in this embodiment, the processor executes according to the program codes stored in the storage medium that the information of the first network element for assisting the second network element in implementing flow control may include at least one of: a buffer size of the first network element, a buffer size provided by the first network element based on user equipment capability, request information through which the first network element requests the second network element to report a flow control state of the second network element.

In some embodiments, in this embodiment, the processor executes according to the program codes stored in the storage medium: receiving the flow control state message transmitted by the second network element connected to the first network element through the fronthaul interface in at least one of the following manners: the flow control state message is encapsulated in a header of a general packet radio service (GPRS) tunneling protocol for a user plane (GTP-U); and the flow control state message is implemented through a control plane interface message.

In some embodiments, in this embodiment, the processor executes according to the program codes stored in the storage medium that the flow control state information includes at least one of: identification information of a data packet received by the second network element from the first network element and successfully transmitted to a UE; a desired buffer size of a protocol data unit (PDU) session in the second network element; a desired buffer size of a data flow in the second network element; a desired buffer size of a radio bearer (RB) in the second network element; a desired buffer size of the second network element based on numerology (a physical layer parameter configuration); a desired buffer size of the second network element based on a network slice; a minimum UE-level desired buffer size; identification information for notifying the first network element of a data packet lost in the second network element; a second network element congestion indication for indicating congestion of the second network element; an overall available buffer size of the second network element; and a flow control indication transmitted by the second network element to the first network element.

In some embodiments, in this embodiment, the processor executes according to the program codes stored in the storage medium: determining the flow control state of the second network element connected to the first network element through the fronthaul interface; and transmitting the flow control state message to the first network element. The flow control state message carries flow control state information for identifying the flow control state of the second network element, and the first network element and the second network element have different functions. The flow control state information is used for performing a flow control processing.

In some embodiments, in this embodiment, the processor executes according to the program codes stored in the storage medium: before receiving the flow control state message transmitted by the second network element connected to the first network element through the fronthaul interface, the method further includes: receiving a data transmission message transmitted by the first network element, where the data transmission message carries data identification information for identifying data transmitted to the second network element by the first network element.

In some embodiments, in this embodiment, the processor executes according to the program codes stored in the storage medium: the data identification information includes at least one of: a data packet serial number for identifying the transmitted data, and packet retransmission indication information for identifying whether the transmitted data is retransmission data.

In some embodiments, in this embodiment, the processor executes according to the program codes stored in the storage medium: before determining the flow control state of the second network element connected to the first network element through the fronthaul interface, the method further includes: receiving information of the first network element and transmitted by the first network element for assisting the second network element in implementing flow control; and performing a flow control processing according to the received information of the first network element for assisting the second network element in implementing the flow control.

In some embodiments, in this embodiment, the processor executes according to the program codes stored in the storage medium that the information of the first network element for assisting the second network element in implementing flow control may include at least one of: a buffer size of the first network element, a buffer size provided by the first network element based on user equipment capability, request information through which the first network element requests the second network element to report a flow control state of the second network element.

In some embodiments, in this embodiment, according to the program codes stored in the storage medium, the processor executes: transmitting the flow control state message to the first network element in at least one of manners: the flow control state message is encapsulated in a header of a general packet radio service (GPRS) tunneling protocol for the user plane (GTP-U); and the flow control state message is implemented through a control plane interface message.

In some embodiments, in this embodiment, according to the program codes stored in the storage medium, the processor executes: the flow control state information includes at least one of: identification information of a data packet which is received by the second network element from the first network element and successfully transmitted to a UE; a desired buffer size of a protocol data unit (PDU) session in the second network element; a desired buffer size of a data flow in the second network element; a desired buffer size of a radio bearer (RB) in the second network element; a desired buffer size of the second network element based on numerology (a physical layer parameter configuration); a desired buffer size of the second network element based on a network slice; a minimum UE-level desired buffer size; identification information for notifying the first network element of a data packet lost in the second network element;

a second network element congestion indication for indicating congestion of the second network element; an overall available buffer size of the second network element; and a flow control indication transmitted by the second network element to the first network element.

In some embodiments, for specific optional embodiments of this embodiment, reference may be made to the examples described in the embodiments and optional implementation modes described above, and the specific examples will not be repeated in this embodiment.

Apparently, it should be understood by those skilled in the art that each of the above-mentioned modules or steps of the present invention may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only optional embodiments of the present disclosure and are not intended to limit the present disclosure, and for those skilled in the art, modifications made in accordance with the principles of the present disclosure should be understood as falling within the scope of the present disclosure.

INDUSTRIAL APPLICABILITY

In the embodiments of the present disclosure, the first network element and the second network element will interact flow control state information. The flow control state information may be used for controlling data flows between the first network element and the second network element, thereby solving a problem of large transmission throughput with huge redundancy and invalid data caused by arbitrary data flow transmission and reception through the interface between the first network element and the second network element, optimizing the throughput performance and having a positive industrial effect. Meanwhile, the throughput optimization is implemented through the interaction of the flow control data, which is simple to implement and has a strong industrial applicability.

What is claimed is:

1. A method, comprising:
transmitting, by a first network element, an instruction to a second network element connected to the first network element through a fronthaul interface, the instruction configured to request the second network element to report a flow control state;
receiving, by the first network element from the second network element, a flow control state message including flow control state information, the flow control state information including a desired buffer size of a radio bearer (RB) of the second network element; and
performing, by the first network element according to the flow control state information, a flow control processing.

2. The method of claim 1, wherein the flow control state message is encapsulated in a header of a general packet radio service (GPRS) tunneling protocol-user plane (GTP-U).

3. The method of claim 1, wherein the first network element corresponds to a central unit and the second network element corresponds to a distributed unit.

4. The method of claim 1, wherein the flow control state message further comprises:
- a desired buffer size of a protocol data unit (PDU) session in the second network element;
- a desired buffer size of a data flow in the second network element;
- a desired buffer size of the second network element based on a physical layer parameter configuration numerology;
- a desired buffer size of the second network element based on a network slice;
- a second network element congestion indication for indicating congestion of the second network element;
- an overall available buffer size of the second network element; and
- a flow control indication transmitted by the second network element to the first network element.

5. An apparatus, comprising:
- a transmission device, the transmission device configured to:
  - transmit an instruction to a network element connected to the apparatus through a fronthaul interface, the instruction configured to request the network element to report a flow control state;
  - receive, from the network element, a flow control state message including flow control state information, wherein the flow control state information includes a desired buffer size of a radio bearer (RB) of the second network element; and
- a processor, the processor configured to:
  - perform, according to the flow control state information, a flow control processing.

6. The apparatus of claim 5, wherein the flow control state message is encapsulated in a header of a general packet radio service (GPRS) tunneling protocol-user plane (GTP-U).

7. The apparatus of claim 5, wherein the apparatus corresponds to a central unit and the network element corresponds to a distributed unit.

8. The apparatus of claim 5, wherein the flow control state message further comprises:
- a desired buffer size of a protocol data unit (PDU) session in the second network element;
- a desired buffer size of a data flow in the second network element;
- a desired buffer size of the second network element based on a physical layer parameter configuration numerology;
- a desired buffer size of the second network element based on a network slice;
- a second network element congestion indication for indicating congestion of the second network element;
- an overall available buffer size of the second network element; and
- a flow control indication transmitted by the second network element to the first network element.

9. A method, comprising:
- receiving, by a second network element, an instruction transmitted by a first network element connected to the second network element through a fronthaul interface, the instruction configured to request the second network element to report a flow control state;
- transmitting, by the second network element to the first network element, a flow control state message including flow control state information, thereby causing the first network element to perform, according to the flow control state information, a flow control processing, wherein the flow control state information includes a desired buffer size of a radio bearer (RB) of the second network element.

10. The method of claim 9, wherein the flow control state message is encapsulated in a header of a general packet radio service (GPRS) tunneling protocol-user plane (GTP-U).

11. The method of claim 9, wherein the first network element corresponds to a central unit and the second network element corresponds to a distributed unit.

12. The method of claim 9, wherein the flow control state message further comprises:
- a desired buffer size of a protocol data unit (PDU) session in the second network element;
- a desired buffer size of a data flow in the second network element;
- a desired buffer size of the second network element based on a physical layer parameter configuration numerology;
- a desired buffer size of the second network element based on a network slice;
- a second network element congestion indication for indicating congestion of the second network element;
- an overall available buffer size of the second network element; and
- a flow control indication transmitted by the second network element to the first network element.

13. A computing device comprising a processor and a memory, wherein the processor is configured to read code from the memory and implement a method recited in claim 9.

14. A computing device comprising a processor and a memory, wherein the processor is configured to read code from the memory and implement a method recited in claim 10.

15. A computing device comprising a processor and a memory, wherein the processor is configured to read code from the memory and implement a method recited in claim 11.

16. A computing device comprising a processor and a memory, wherein the processor is configured to read code from the memory and implement a method recited in claim 12.

* * * * *